United States Patent [19]

Ancona

[11] 4,418,490
[45] Dec. 6, 1983

[54] FISH BAIT PROTECTOR

[76] Inventor: Frank A. Ancona, 5424 N. Tracy, Kansas City, Mo. 64118

[21] Appl. No.: 356,942

[22] Filed: Mar. 11, 1982

[51] Int. Cl.³ ............................................. A01K 97/06
[52] U.S. Cl. ........................................ 43/25.2; 43/57.1
[58] Field of Search ..................... 43/25.2, 25, 26, 4.5, 43/55, 57.1

[56] References Cited

U.S. PATENT DOCUMENTS

| 1,623,429 | 4/1927 | Martinson | 43/57.1 |
|---|---|---|---|
| 2,699,623 | 1/1955 | Pragalz | 43/25.2 |
| 2,767,502 | 10/1956 | Reynolds | 43/25.2 |
| 3,199,243 | 8/1965 | Caston | 43/25.2 |
| 3,453,770 | 7/1969 | Schultz | 43/57.1 |
| 3,769,741 | 11/1973 | Hessler | 43/57.1 |
| 3,940,873 | 3/1976 | Lawless | 43/57.1 |
| 4,203,245 | 5/1980 | Peterson | 43/25.2 |

Primary Examiner—Gene P. Crosby
Attorney, Agent, or Firm—John A. Hamilton

[57] ABSTRACT

A fish bait protector consisting of a two-leaf folder having an outer waterproof cover and an inner layer of sponge adapted to be saturated with water, and adapted to receive flesh baits therein for moisturization protection. Fastening devices are provided for securing the folder leaf edges releasably together to inhibit circulation of air therebetween. The folder may also receive a fishhook or lure therein, so that the flesh bait need not be detached from the hook during periods of non-use. Also, the folder may be folded about a fishing rod to secure the bait in position for immediate use whenever desired, and to prevent fouling thereby of nearby gear in a fishing boat or the like.

6 Claims, 4 Drawing Figures

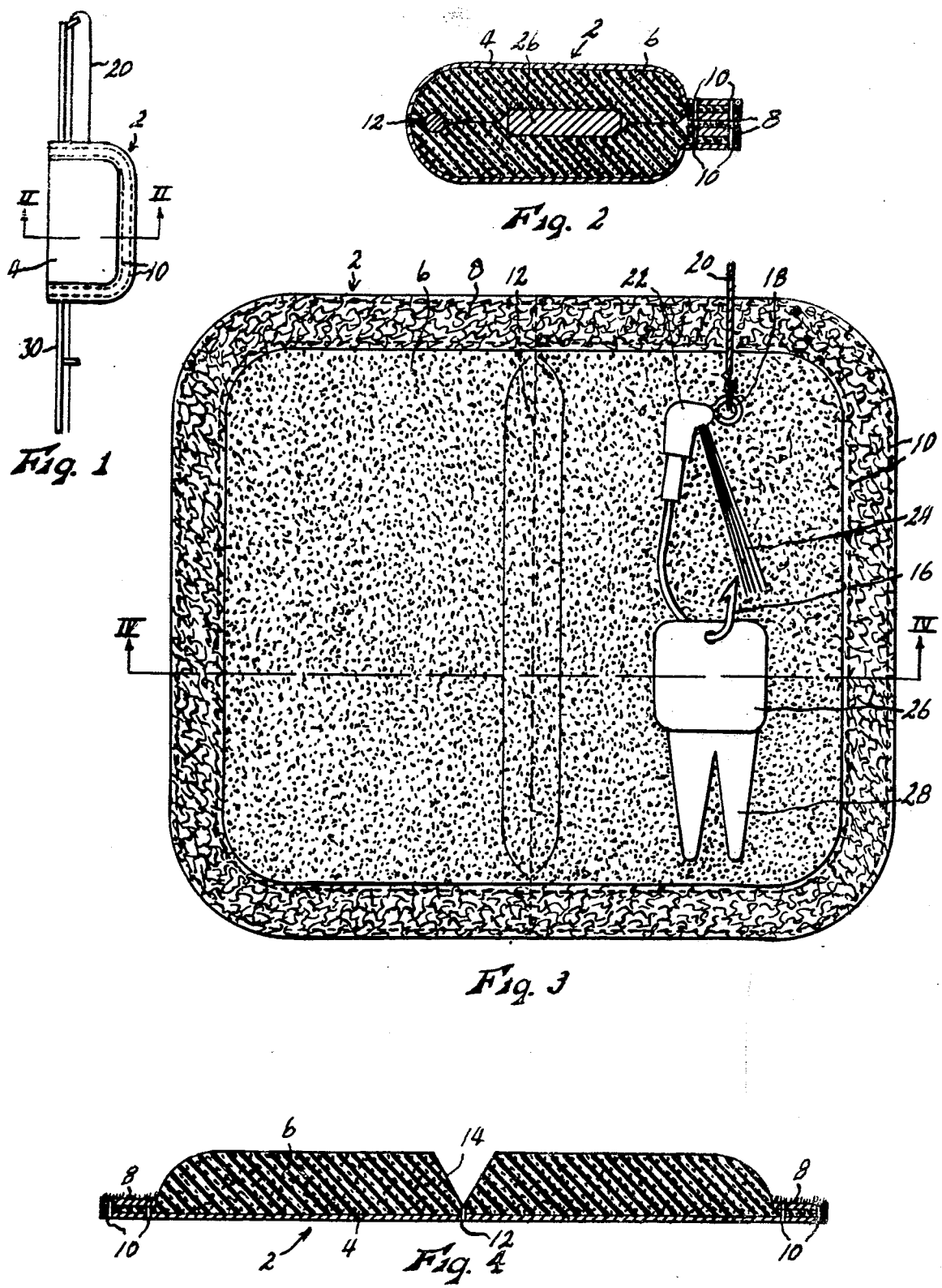

FISH BAIT PROTECTOR

This invention relates to new and useful improvements in fishing gear, and has particular reference to a device for protecting and preserving flesh baits.

Many fishermen commonly use bits of animal flesh as bait, such as bits of pork entrails, flesh, or pork rind, which are commonly known as "pork baits", as well as other types of flesh, by securing such bait on a fishhook, the fishhook usually constituting a portion of a more elaborate lure. Also, many fishermen, particularly serious or professional fishermen, commonly equip themselves with several fishing rods on any fishing trip, each fitted with a different lure or bait adapted for use with a different species of fish he may encounter, or for which he may intend to fish. One or more of these lures and baits may include flesh baits such as pork. A commonly encountered problem arises from the fact that such flesh baits must be kept moist with water or other liquid when not in use, or they become dry or leather-like, become stiff or rigid, and lose their odor, which makes them less attractive to fish, and hence eventually become unusable. The fisherman normally preserves such baits in small jars or bottles of water or other liquid in his tackle box when not fishing, but if he has baited some of his rods with this bait in preparation for fishing, it is tedious and time-consuming for him to remove said bait from the hooks and return them to jars or bottles whenever he is not using those rods. It is also somewhat difficult to remove such baits from the fishhooks, due to the barbs of the hooks. He of course desires to have the flesh-baited rods available for almost instantaneous use whenever desired, but if he baits hooks with flesh and does not use them for considerable lengths of time, the bait may be useless.

The present invention has as its object the provision of a bait protecting device which will maintain flesh baits moist and fresh and flexible for time periods at least several hours in length, even after the bait has been applied to a fishhook, while still maintaining it in full readiness for use whenever desired. Generally, this object is accomplished by the provision of a bait protector comprising a two-leaf folder having a waterproof cover sheet and a liner layer of a sponge material adapted to be saturated at any time simply by dipping it in water. When closed about the bait, the sponge supplies ample water to maintain the bait moist for many hours. The folder may be of sufficient area to enclose not only the flesh bait but also the hook or lure to which it is attached, and the sponge layer may be sufficiently soft and deep that it will form itself snugly about the bait and lure to inhibit the circulation of drying air thereabout. Means are provided for fastening the free edges of the folder together when the folder is closed, both to apply pressure to the sponge liner to form it around the bait and lure, and also to inhibit still further the entry of any air into the folder. If the lure and bait are attached to the line of a fishing rod, which is desirable and customary, the folder may also be positioned to include the fishing rod therein, so that the entire assembly of rod, line, lure and bait may be readied for immediate use simply by opening and removing the folder.

Other objects are simplicity and economy of construction, efficiency and dependability of operation, and ease and convenience of use.

With these objects in view as well as other objects which will appear in the course of the specification, reference will be had to the accompanying drawing, wherein:

FIG. 1 is a fragmentary elevational view of a fishing rod, showing a bait protector embodying the present invention applied operatively thereto, FIG. 2 is an enlarged sectional view taken on line II—II of FIG. 1, FIG. 3 is an inner face view of the protector, shown in a laid-out position, to the same scale as FIG. 2, and showing a fishing lure and bait placed thereon in preparation for closing of the protector thereabout, and FIG. 4 is a sectional view of the protector only, taken on line IV—IV of FIG. 3.

Like reference numerals apply to similar parts throughout the several views, and the numeral 2 applies generally to a fish bait protector embodying the present invention. Said protector consists of a two-leaf folder shown as generally rectangular, although its shape is optional, having an outer or cover layer 4 of a thin, pliable, tough waterproof material such as vinyl, and an inner layer or liner 6 of a soft, sponge material such as synthetic foam. Said liner is relatively thick as compared to the cover, and is of the same area as the cover, coinciding therewith. Both the cover and the liner are formed of materials which are not deteriorated by water, although the liner is capable of absorbing and retaining a substantial quantity of water when dipped therein.

A strip 8 of Velcro fastener material is sewed to the edge portion of the inner, or exposed, surface of liner 4 by a double line of stitching 10. Said fastener strip extends around the entire periphery of the liner, as shown in FIG. 3, and the stitching is made with sufficient thread tension to compress the sponge liner to a small fraction of its normal thickness, as best shown in FIG. 4. Velcro is a well known fastener consisting of a fabric or other flexible base in which are affixed projecting hooked strands of a relatively stiff material. When two such members are pressed together, the hooked strands interengage to hold the members firmly together, although they may readily again be separated by the application of substantial manual separating force, and may be repeatedly rejoined and separated. Midway between the two shorter sides of the sponge, it is stitched to cover 4 by a parallel line of stitching 12, along the base of a V-shaped groove 14 formed in the inner surface of the sponge. This groove, and stitching 12, form a natural fold line along which the cover-liner combination may be folded and closed in the manner of a book, as shown in FIG. 2.

In use, the folder 2 is first dipped in water to saturate liner sponge 6, and then laid out flat as shown in FIG. 3, and a lure and bait laid on one side thereof. The lure, though not itself a part of the invention, consists of a fishhook 16 having an eye 18 into which a fishing line or leader 20 is tied, and a head 22 of lead or the like molded on the shank thereof adjacent the eye, so that the lure sinks and may be pulled along the bottom. A weed guard 24 consisting of a small bundle of flexibly resilient strands may be fixed in head 22, and extends adjacent the barbed point of the hook to guard it against fouling by underwater vegetation. Though not shown, a bundle of limply pliable strands may also be tied to the head to trail therebehind as the lure is drawn through the water to simulate the appearance of a bait body. The bait shown is of the flesh type, and is specifically of the "frog" type consisting of a lump 26 of pork flesh or pork rind, simulating the appearance of a frog body, and a flexible strip 28 of pork hide or the like secured to and extending from lump 26, and cut to simulate the appearance of frog legs, although the specific type of flesh bait is immaterial to the invention. The barbed point of the fishhook is pierced through lump 26 to mount the bait on the lure.

Then, with the lure and bait arranged as nearly flat on the sponge pad as possible, the protector is arranged so that the fishing rod 30 from which line 20 extends is disposed over the sponge pad within groove 14 thereof, preferably adjacent the tip of the fishing rod as shown in FIG. 1, and the folder closed, with the bait, lure and fishing rod included therein as shown in FIG. 2, and secured closed by pressing the then confronting surfaces of Velcro fastener strip 8 firmly together.

The sponge liner layer 6 holds sufficient water to maintain the flesh bait 26—28 moist and pliable for long periods of time, even for several days. The waterproof outer cover 4, and also the reasonably effective sealing of the folder by fastener strip 8, greatly inhibits the evaporation of the water. It will be noted also, from comparison of FIGS. 2 and 4, that when the folder is secured closed by fastener strip 8, its volume is insufficient to contain the normal, uncompressed volume of the sponge liner. Therefore, closure of the folder requires pressure on and compression of the liner. This pressure molds the sponge liner firmly about the lure and bait, as indicated in FIG. 2, so that virtually no air, even that small amount of air which can enter the folder past the fastener 8, can circulate around the bait. Such air circulation could dry the bait, and its exclusion is therefore important. It is also important that the fastener strip 8 extends along all three of the "open" edges of the folder. Not only does this provide the most efficient seal against the entry of air, but also it provides for a more uniform pressure compressing the sponge liner. Of course the Velcro fastener material does not adhere directly to fishing rod 30, but the rod is quite small in diameter, and the strips 8 should be pressed together as closely as possible to the sides of the rod.

The flesh baits, such as that shown at 26—28, could of course be stored and protected in the folder shown when not attached to fishhooks, lures or lines, and in such cases the folder could serve merely as a "bait box" holder for such baits until use thereof is desired. Also, the folder need not be secured around the fishing rod, as shown in FIG. 1, if this is not desired. However, the illustrated and described use, with the bait secured to the fishhook, the hook secured to the fishing line, and the folder secured about the fishing rod to secure the hook and bait against possible fouling with other gear, is believed to be the most advantageous, in that it maintains the entire combination of rod, line, hook and bait in constant readiness for virtually instantaneous use, the only preparation required being the removal of the protector folder.

While I have shown and described a specific embodiment of my invention, it will be readily apparent that many minor changes of structure and operation could be made without departing from the spirit of the invention.

What I claim as new and desire to protect by Letters Patent is:

1. A fish bait protector comprising:
   a. a pair of separable panels each having a flexible, waterproof outer cover layer, and an inner liner layer, confronting the other of said panels, formed of a resiliently compressible porous material capable of absorbing and retaining a substantial quantity of water, and
   b. fastening means operable to join the edge portions of said panels firmly but separably together around substantially the entire peripheries of the separable edges of said panels, whereby to form a seal inhibiting both the exit of water from between the panels and the circulation of air between said panels.

2. A fish bait protector as recited in claim 1 wherein said liner layers are formed of a compressible sponge material, and are of such thickness that said fastening means is operable to compress said sponge material when said panels are joined thereby, whereby said sponge material is molded firmly about said bait to better inhibit circulation of air around said bait.

3. A fish bait protector as recited in claim 1 wherein said panels constitute the leaves of a two-leaf folder, being permanently joined along one pair of coinciding edges thereof, said folder having an outer cover layer of flexible material, whereby said folder may be opened and closed in the manner of a book, and an inner liner layer of said porous material, said fastening means being operable to join releasably the edges of said panels opposite said permanently connected edges.

4. A fish bait protector as recited in claim 3 wherein said cover layer is formed of a relatively tough sheet material and said porous liner layer is formed of a relatively soft, compressible sponge material, and wherein said fastening means is operable, when securing said folder closed, to so restrict the volume of said folder as to cause compression of said sponge material whereby the latter is molded closely around said bait.

5. A fish bait protector as recited in claim 4 wherein said fastening means is operable to join the corresponding edges of said panels together around substantially the entire periphery of the folder formed thereby, except along the edges thereof which are permanently joined.

6. A fish bait protector as recited in claim 4 wherein said fastening means comprises strips of Velcro material secured to the edge portions of the mating surface of said liner layer.

* * * * *